United States Patent [19]

Fricker et al.

[11] Patent Number: 4,525,968
[45] Date of Patent: Jul. 2, 1985

[54] ALL-METALLIC HEAT INSULATION, FORMED OF HEAT INSULATING BUILDING BLOCKS WHICH CAN BE JOINED TOGETHER

[75] Inventors: Wolfgang-Peter Fricker, Freinsheim; Manfred Scholz, Erlangen, both of Fed. Rep. of Germany

[73] Assignee: Kraftwerk Union Aktiengesellschaft, Mulheim, Fed. Rep. of Germany

[21] Appl. No.: 426,789

[22] Filed: Sep. 29, 1982

Related U.S. Application Data

[62] Division of Ser. No. 229,645, Jan. 29, 1981.

[30] Foreign Application Priority Data

Feb. 1, 1980 [DE] Fed. Rep. of Germany ....... 3003708

[51] Int. Cl.$^3$ .............................................. E04B 2/00
[52] U.S. Cl. ....................................... 52/406; 52/407; 52/807
[58] Field of Search ................ 52/806, 807, 799, 802, 52/406, 407, 404; 428/186, 185, 184, 178, 920, 72, 74, 76; 220/3.1, 415, 419, 420, 421, 423, DIG. 9

[56] References Cited

U.S. PATENT DOCUMENTS

| | | | |
|---|---|---|---|
| 1,046,455 | 12/1912 | Forsyth | 52/799 X |
| 1,535,504 | 4/1925 | Stephens | 52/407 |
| 2,112,400 | 3/1938 | Gould | 428/72 |
| 2,123,761 | 7/1938 | Morton | 52/407 |
| 2,161,037 | 6/1939 | Gould | 220/DIG. 9 |
| 2,397,345 | 3/1946 | Gilleland | 52/407 |
| 2,841,203 | 7/1958 | Gronemeyer | 138/149 |
| 3,397,720 | 8/1968 | Jones | 220/423 |
| 3,917,471 | 11/1975 | Becker | 52/406 |
| 3,981,689 | 9/1976 | Trelease | 138/147 |
| 4,247,583 | 1/1981 | Roy | 52/406 X |
| 4,258,521 | 3/1981 | Fricker et al. | 52/406 |

Primary Examiner—John E. Murtagh
Attorney, Agent, or Firm—Herbert L. Lerner; Laurence A. Greenberg

[57] ABSTRACT

All-metal heat insulation, including building blocks which can be joined together, the building blocks each including metallic foils being thermally movably supported and mutually spaced apart from each other forming insulating cells therebetween, spacer strips for maintaining the mutual spacing between the foils, and at least two housing plates at least partly surrounding the foils and spacer strips and being disposed at a given distance from each other, the spacer strips being adjacent to each other and being fastened to at least one of the housing plates, the spacer strips being mutually spaced apart from each other at a distance at least equal to the thickness of one foil forming receiving pockets for the foils at least at one of the plates, the foils being shorter than the given distance between the housing plates and being slideably fitted in the receiving pockets.

3 Claims, 14 Drawing Figures

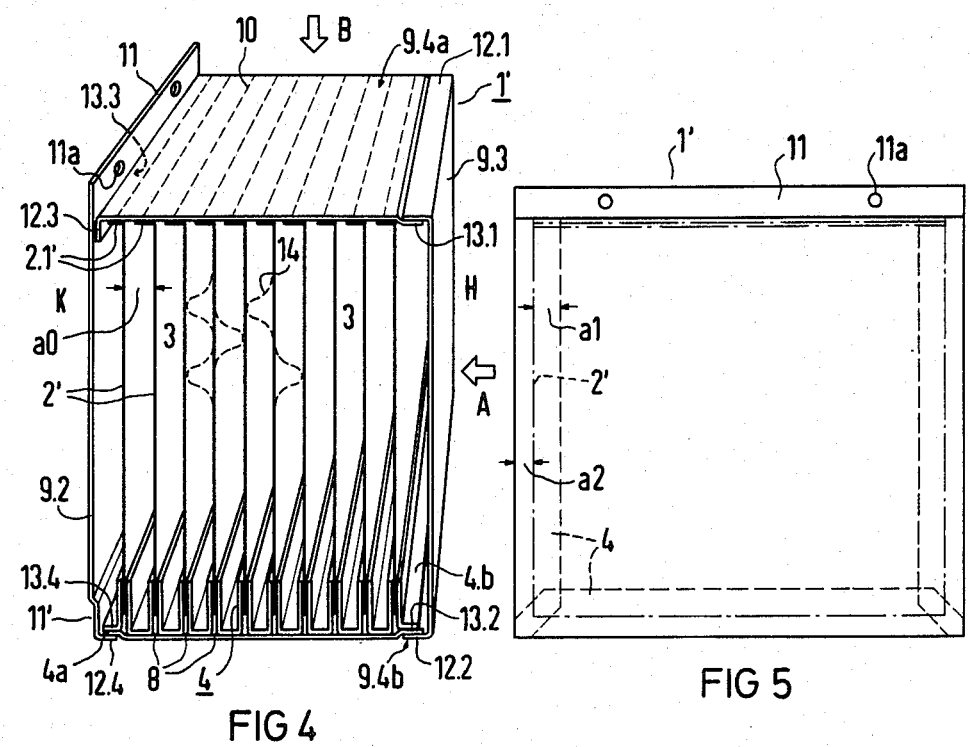
FIG 4
FIG 5
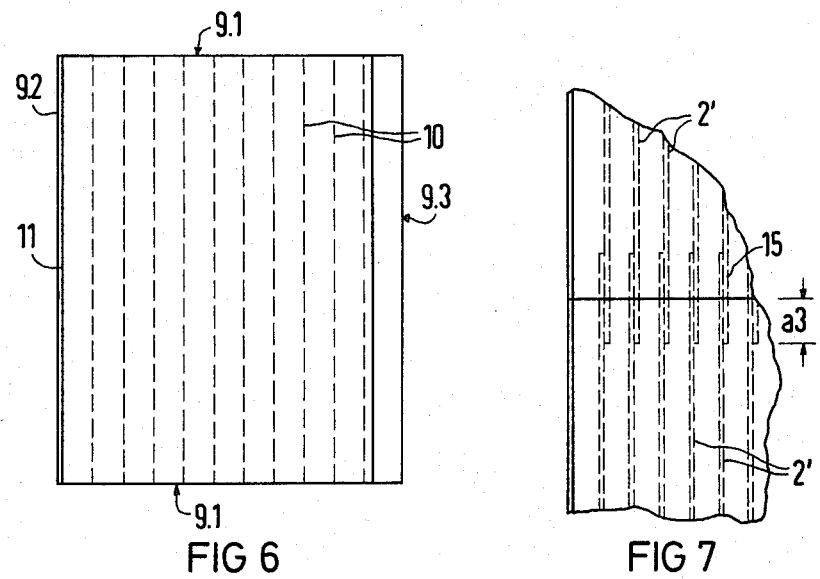
FIG 6
FIG 7

ALL-METALLIC HEAT INSULATION, FORMED OF HEAT INSULATING BUILDING BLOCKS WHICH CAN BE JOINED TOGETHER

This is a division of application Ser. No. 229,645, filed Jan. 29, 1981.

The invention relates to an all-metallic heat insulation including heat insulating building blocks or structural units which can be joined together, the building blocks each including metallic insulating foils which are spaced apart with respect to each other and are thermally movably supported, forming insulating cells therebetween, spacer elements maintaining distances between the foils, and housing plates at least partly surrounding the assembly.

An all-metallic heat insulation of this type is known from German Published, Non-Prosecuted Application DE-OS No. 27 34 348 (1) and DE-OS No. 27 29 453 (2). Through the use of these known heat insulations, a solution has been found to the problem of minimizing the so-called inner convection within the heat insulating-building blocks, while still assuring the thermal mobility of the individual insulating foils. In this manner distortion of the metal foils and of the housing walls is avoided to a great extent. Such distortions lead to undesirable convection gaps, and thereby to an increase of the heat losses. Therefore, the known all-metallic heat insulations have been applied with success for heat insulation in nuclear reactor plants, especially in pressure vessels of nuclear reactors. If for this application the user requires that the heat insulation be exposed to water or to flooding without decreasing its good heat insulation properties, the heat insulating building blocks can be constructed as water-tight cassettes having housing plates made of austenitic steel, which is corrosion-resistant. Such a case of flooding can occur, for example, during a change of the fuel elements, when the reactor pit is flooded. Normally, the annular space between the reactor pressure vessel and the biological interior shield, where the heat insulation is located, is sealed by flood compensators against the flooded reactor chamber. However, during an undesired malfunction, leakage may occur at the flood compensators, and in this case the water and corrosion resistance of the heat insulation is an advantage, because it can continue to be used after the entered flood water has been removed.

It is accordingly an object of the present invention to provide an all-metallic heat insulation formed of heat insulating building blocks which can be joined together, that overcomes the hereinafore-mentioned disadvantages of the heretofore-known devices of this general type, and to do so in the direction of making their manufacture more price-advantageous or economical, and their configuration more versatile with respect to their application. This means, especially, that the heat insulating building blocks according to the invention are suitable as well for the heat insulation of components with flat or slightly curved outer surfaces, for the heat insulation of components with smaller radii of curvature of their outer surfaces, and for the insulation of pipe lines. Summarizing, the new heat insulation should satisfy the following requirements:

(a) Absorbing the heat expansion of the individual heat insulating foils;
(b) Avoidance of deformations of the foils, and thereby of changes in the distance between the individual insulating foils and avoidance of deformations of the housing plates of the heat insulating building blocks;
(c) Increase of the heat-insulating capacity of the all-metallic heat insulation by exactly maintaining the spacings between the insulating foils;
(d) Reliable avoidance of damage to the insulating foils;
(e) Simplification of manufacture by permitting greater tolerances when cutting and blanking the foils; and
(f) Avoidance of any convection within the heat insulating building blocks.

With the foregoing and other objects in view there is provided, in accordance with the invention, an all-metallic heat insulation, comprising building blocks which can be joined together, the building blocks each including metallic foils being thermally movably supported and mutually spaced apart from each other forming insulating cells therebetween, spacer strips for maintaining the mutual spacing between the foils, and at least two housing plates at least partly surrounding the foils and spacer strips and being disposed at a given distance from each other, the spacer strips being adjacent to each other and being fastened to at least one of the housing plates, the spacer strips being mutually spaced apart from each other at a distance at least equal to the thickness of one foil forming receiving pockets for the foils at least at one of the plates, the foils being shorter than the given distance between the housing plates and being slideably fitted in the receiving pockets.

In accordance with another feature of the invention, the spacer strips are formed of outer U-profiled strips and inner angled strips.

In accordance with a further feature of the invention, the building blocks are closed on all sides thereof.

In accordance with an added feature of the invention, the building blocks are in the form of gas-tight encapsulated cassettes.

In accordance with an additional feature of the invention, the building blocks have a circle-segment shaped cross section for enclosing round cylinder-shaped components or pipe lines, the foils lying on substantially concentric cylindrical mantle surfaces.

In accordance with again another feature of the invention, the building blocks are half-shell shaped for pipe lines.

In accordance with again a further feature of the invention, the building blocks are substantially cube-shaped and the foils are substantially parallel to each other.

In accordance with again an added feature of the invention, the foils have four sides and the receiving pockets are disposed at each of the four sides for thermally movably retaining the foils thereat.

In accordance with again an additional feature of the invention, the foils have one bent side being welded to one of the housing plates and other sides being thermally movably retained in the receiving pockets.

In accordance with yet another feature of the invention, the foils have overlapped projecting ends, and the building blocks have open side surfaces being adjacent to and pointing in the direction of the circumference of a component to be insulated, the building blocks being joinable together with the projecting ends.

In accordance with yet a further feature of the invention, the foils have middle zones between edges thereof, and there are provided reinforcement or corrugation means for additional spacing disposed at least at the middle zones.

In accordance with yet an added feature of the invention, there are provided spring-elastically sealing knife-like lamellar tongues and doubly-bent lamellar tongues forming push-in pockets, the knife-like and doubly-bent tongues being alternatingly disposed on the building blocks for engagement with each other, the doubly-bent tongues being formed at an acute angle with respect to a housing plate and being elastically deformable toward the inside and tightenable upon joining two building blocks together.

In accordance with yet an additional feature of the invention, the U-profiled strips are formed of assembled L-profiled strips each having a lesser wall thickness than the U-profiled strips.

In accordance with a concomitant feature of the invention, the U-profiled strips are formed of a meander-shaped bent profile band having U-shaped legs forming the receiving pockets from hairpin cross-sectionally-shaped bent projections.

The advantages achieved by the invention can be especially seen in the fact that the construction of the heat-insulating building blocks has been considerably simplified. The U-profiled strips can be made of rod stock; preferably, they are fastened to the side plates by spot welding at the assembly of the building block, then an insulating foil is placed on top, and strongly pressed onto the U-profiled strip below with the next U-profiled strip. The pressing is done with gages so that the dimensions are 100% accurate. When installing the insulating foils, it must be observed that they have a spacing of about 10 mm to the housing end plates, and can freely expand to all sides under heat and action. Because of the strong pressing, a reversed heat convection within the heat insulating building blocks from foil layer to foil layer is reliably avoided. Because of the given approximate distance to the housing end plates, an absolutely accurate blank size is not necessary, which results in a considerable work simplification, especially with arched insulating foils which have a different cut from position to position.

Other features which are considered as characteristic for the invention are set forth in the appended claims.

Although the invention is illustrated and described herein as embodied in an all-metallic heat insulation, formed of heat insulating building blocks which can be joined together, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4 is a diagrammatic perspective view of a section of a second typical embodiment device with a square heat-insulating building block;

FIG. 5 is a side elevational view taken along the direction of the arrow A in FIG. 4;

FIG. 6 is a top plan view taken along the direction of the arrow B in FIG. 4;

FIG. 7 is a fragmentary view of a cut-out of two adjoining heat insulating building blocks according to FIGS. 4 to 6, which are open at their meeting or joining surfaces, and overlap with their insulating foils;

FIGS. 15 and 16 are diagrammatic cross-sectional views of two different constructions for the U-shaped profile strips.

Figure 1:
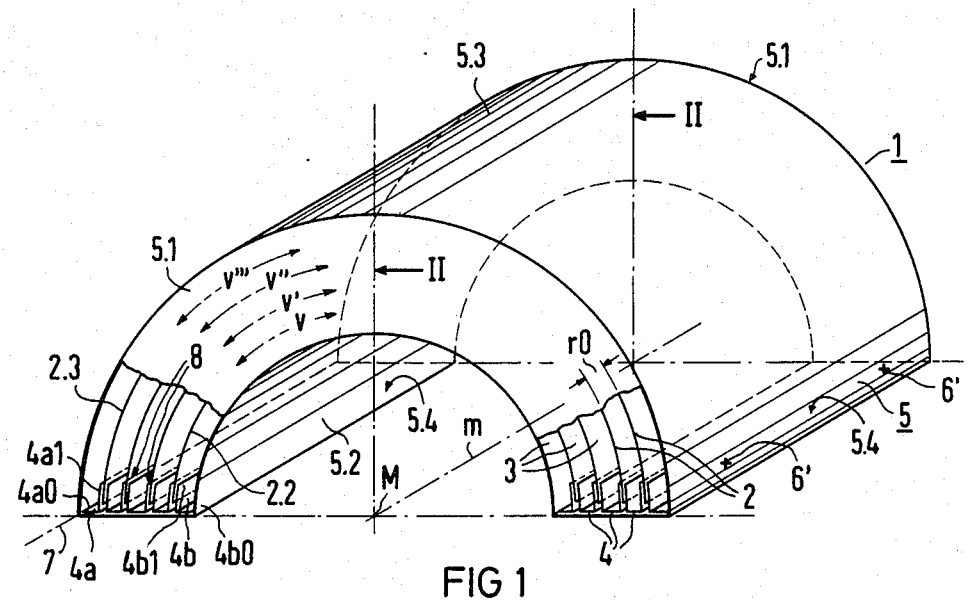
FIG. 1 is a diagrammatic perspective view, partly broken away, of a heat-insulating module or building block having the shape of a half-shell, which serves with a corresponding second half-shell-shaped heat-insulating module to insulate a pipe line.
Figure 3:
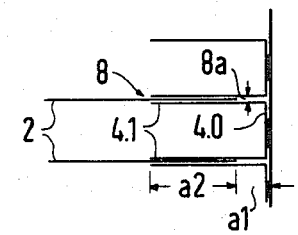
FIG. 3 is an enlarged view of the dot-dash circle Z in FIG. 2.
Figure 2:
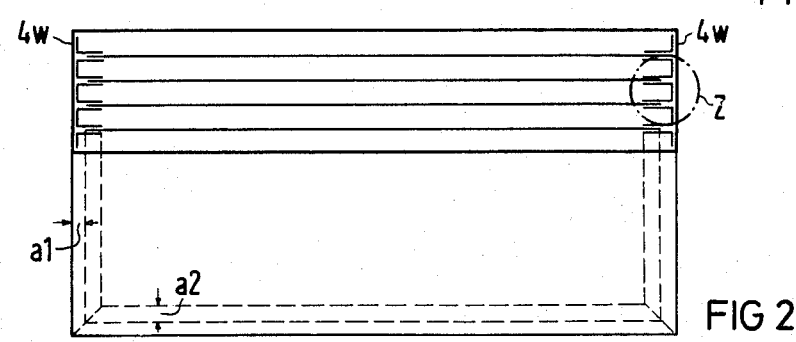
FIG. 2 is a partially elevational and partially cross-sectional view taken along line II—II in FIG. 1, in the direction of the arrows.

Referring now to the figures of the drawing and first, particularly to the embodiment of FIGS. 1–3, it is seen that the heat insulating building block 1(which will be called merely "building block", for simplification) includes metallic insulating foils 2 which are mutually spaced apart with respect to each other, are supported in a thermally movable manner, and are used for assembling thermal insulation cells 3. The insulating foils 2 are spaced from each other at a distance r0 by spacer elements 4. The spacer elements 4 and the insulating foils 2 are carried at least partially by the housing shells which contain the insulating foils 2 and the spacer elements 4. The housing shells which are as a whole designated by reference numeral 5, include front plates 5.1, an inner shell 5.2, an outer shell 5.3, and furthermore plates 5.4 at the meeting or joining surfaces.

The building block 1 serves as a heat insulating mantle of a pipe line which is not shown, whereby a corresponding opposing building block surrounds the pipe line from below, and is connected to the illustrated building block 1 in a suitable manner. For example, the connecting means can be a selflocking, rapidlocking toggle clamp 6, which is shown in detail in a perspective view in FIG. 14. The tension bracket 6a, and the mating latch 6b of the clamp 6 can be fastened at the places marked by small crosses 6' at the outer mantle 5.3 of the building block 1 in FIG. 1. In that case, the non-illustrated opposing building block would be provided with mating hooks or latches 6b, that connect to the tension bracket 6a. If the illustrated building block 1, together with the non-illustrated, opposing building block were provided with a hinge in the region of a line 7 on the shell, the toggle clamps at the places 6' would suffice, otherwise additional toggle clamps would have to be provided at building block 1 and its counter part in positions aligned in a mirror image to the places 6' shown.

The non-illustrated pipe line which is to be insulated by the building block 1 and its counter building block, can be, in particular, the pipe line for the primary circuit of a pressurized water-nuclear reactor. It can also be a cylindrical component of the primary circuit, such as a pressure accumulator. In principle, the heat insulating building blocks according to the invention can also be used for other pipe lines or components, such as in conventional steam power plants, in particular wherever outstanding heat insulation is of importance.

According to the invention, the spacer elements 4 of the building block 1 include U-profiled connecting strips 4, the connecting portion of which between their legs is designated with reference numeral 4.0, and the legs of which are designated with reference numeral 4.1 (compare also FIGS. 2 and 3). Outside of the outermost insulating foil 2.3 and the innermost insulating foil 2.2, U-profiled strips are not necessary. Instead angular strips 4a (outside) and 4b (inside) suffice. These have radial legs 4a0 and rb0, respectively, and tangential legs are designated with reference numerals 4a1 and 4b1, respectively. In the region of the joint and accordingly at the meeting surfaces, the aforementioned rectangular joint separating plates 5.4 are disposed. The plates 5.4 are welded in a suitable manner (which is not shown) to the mantle shells 5.2, 5.3 and the end plates 5.1. They increase the stiffness of the building block.

As shown in FIG. 1, the U-profiled strips 4 and also the angular strips 4a, 4b are fastened to the housing plates 5.4 so as to be adjacently spaced from each other at a distance of at least one thickness of the insulating foils, so that receiving pockets 8 for the insulating foils are formed.

FIG. 2, in conjunction with FIG. 3, shows that corresponding U-profiled strips 4 and angular strips 4w are also welded to the end-plates 5.1, extending in a semicircle from the inside. The spacing of at least one insulating foil thickness for forming the receiving pockets 8 is designated with reference numeral 8a in FIG. 3. Thus, the insulating foils 2, in the embodiment according to FIGS. 1 to 3, are held on all four sides with a slide fit in the receiving pockets 8. For this purpose, the insulating foils 2 are shorter than the respective connecting line v, v', v'', v''' between the two joint separating plates 5.4., as seen in FIGS. 1-3. The connecting lines are therefore circular arcs, the length of which decreases toward the inside, corresponding to the distance of their radii from the middle-point M, and from the theoretical pipe and component axis m. Accordingly, the insulating foils 2 differ in their tangential length; they are shorter by a factor of two times a1 than the respective connecting lines v, v' etc. (See FIG. 3). FIG. 3 also shows that overlapping spaces a2 are provided between the legs 4.1 of the U-profiled strips and the ends of the insulating foils 2. Corresponding overlapping spaces are also provided between the legs 4a1 and 4b1 of the angular strips 4a, 4b and the adjacent insulating foils 2, as seen in FIG. 1.

As can be seen, the insulating foils 2 lie approximately on concentric cylinder mantle surfaces. They are formed of thin austenite sheetmetal plates of approximately 0.2 to 0.3 mm thickness. The housing plates 5 are thicker than these; their wall thickness is, for example 0.5 to 1 mm.

The housing plates 5 are preferably austenitic as well. Thus, the insulating foils are thermally movably contained in the receiving pockets 8; they can freely expand and contract. In this way no deformations occur, and the distances between the insulating foils 2 in the insulating direction (corresponding to the radial direction) remains practically constant.

According to a varied construction of the sample embodiment according to FIGS. 1 to 3, the building blocks 1 can also be open at their ends, i.e. the end plates 5.1 are omitted. In this case, the insulating foils can project a little in the direction of the axis m, so that they can be installed so as to be overlapping with the insulating foils of the adjacent building blocks, forming a lamellar seal. However, for usage as thermal insulation of pipelines in the primary circuit of a pressurized water reactor, the building blocks 1 are preferably closed on all sides, by housing plates 5, thus forming sealed, gas-tight cassettes, into which—as initially mentioned—reactor water cannot enter.

In the second embodiment according to FIGS. 4 to 6, the heat-insulating building blocks 1' are essentially cube-shaped bodies, whereby the insulating foils 2' run with faces extending parallel to each other, with a spacing a0 from each other. The insulating cells are again designated with reference numeral 3.

The insulating foils 2' are each provided with bent edges 2.1', as seen especially in FIG. 4. The foils 2' are fastened by spot welding with these bends at the upper housing plate 9.4a; the spotwelds being indicated by the dotted lines 10. However, at their remaining sides, the insulating foils 2' are again thermally movably retained in the receiving pockets 8, which are formed by the U-profiled strips 4 and the angular strips 4a, 4b. The contour of the insulating foils 2' is shown in dot-dash lines in FIG. 5. As before, free spaces a2 and overlapping spaces a1 are provided in the receiving pockets 8.

In FIG. 4, the so-called hot side of the thermal insulation is designated with reference symbol H, and the so-called cold side with reference symbol K. For example, the building block 1' according to FIG. 4, is fastened with an extending ledge 11 at the cold side of a housing plate 9.2 to the inner circumference of the biological shield of a pressure vessel of a nuclear reactor, such as by rivets (striker pins). The rivets extend through corresponding holes 11a of the extended ledge 11, and hold against the biological shield with a head. In this case, the position shown in FIG. 4 would be the right position, and plate 9.4a would be the housing plate on top while the plate 9.4 would be the bottom housing plate. The side plates of the housing which point in the tangential direction are designated with reference numeral 9.1. For simplicity, the curvature of the biological shield is not taken into account, i.e. the building blocks 1' are shown as cubes though they become somewath slightly smaller from the cold side K (of greater diameter) toward the hot side H (of smaller diameter).

Corresponding to the extending ledge 11, the wall 9.2 of the building block has at its lower end a set-back portion 11', into which the ledge 11 of the building block below form-fittingly engages. In other words the two ledges are shaped in such a way that their forms fit together. The outer housing plate 9.3, the top housing plate 9.4a and also the inner housing plate 9.2 are each provided with angle bends 12.1, 12.2 and 12.4, with which they are welded to corresponding surfaces 13.1, 13.2, 13.3 and 13.4 of the housing plates 9.4a, 9.4b and 9.2, so that a seal is formed. The counter surfaces 13.1, 13.2 and 13.4 for welding are each provided with offsets of the corresponding housing plates, so that, with the angle bends 12.1, 12.2 and 12.4, a flat and flush joint to the outside is formed.

If the insulating foils 2' have a larger area, it can be advantageous to provide them with relief-like shaping or corrugations at least in the middle thereof, away from the edges or with reinforcements 14, as indicated by dotted lines in FIG. 4. These corrugations 14 serve as additional spacers for maintaining the exact distance between the insulating foils 2', and thereby between the insulating cells 3. They do not interfere with the heat expansion or contraction of the insulating foils 2' during heating and cooling. According to FIGS. 4 to 6, the building block 1' shown there is also closed on all sides thereof by its housing plates, i.e. it is constructed as a gas-tight cassette. If the possibility of exposure to reactor water is not present, or if the operator does not require a gas-tight assembly, the cassettes 1' can also be constructed with their side surfaces 9.1 open. This causes no disadvantages with respect to its convection behavior, because no convection flow could occur in the horizontal direction. In this case, the insulating foils 2' can be elongated beyond the side surfaces 9.1 of the building block 1' with a projecting portion a3, as indicated in FIG. 7, whereby the tangentially adjacent building blocks 1' lie overlapping to each other with their projecting tongues 15, so that they are movable by heat, and form a lamellar seal.

Figure 8:
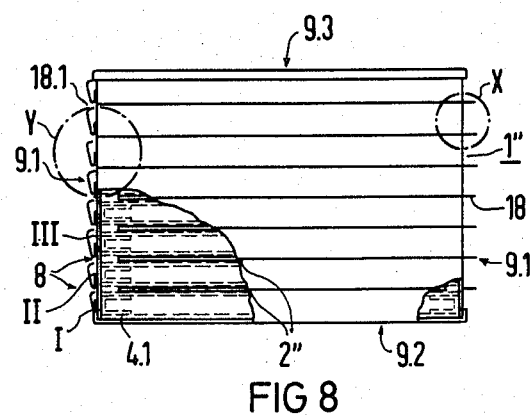
FIG. 8 is a diagrammatic elevational view of a third typical embodiment device wherein, deviating from the embodiment according to FIGS. 4 to 6, the insulating foils are not only held at three sides, but are retained in the receiving pockets at all four sides.
Figure 9:
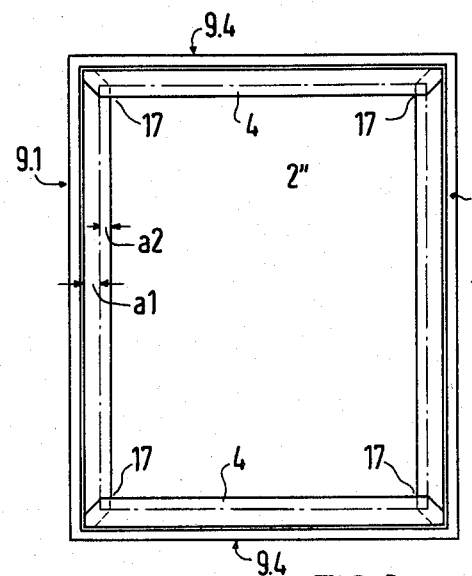
FIG. 9 is a top plan view of the arrangement according to FIG. 8 with the housing cover sheet removed from the top.
Figure 10:
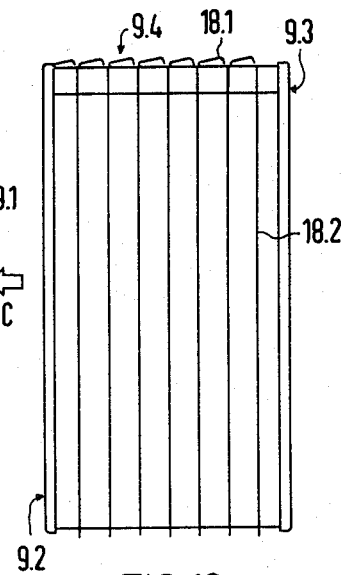
FIG. 10 is a side elevational view taken along the direction of the arrow C in FIG. 9.
Figure 11:
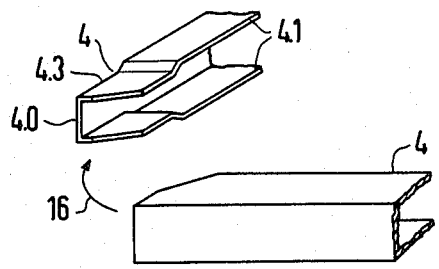
FIG. 11 is a fragmentary perspective view of two partial sections of strips with U-shaped profiles, which can be slid into each other, and which overlap in their corner regions.

The third embodiment according to FIGS. 8 to 11 is also an approximately square building block 1''. However, here the insulating foils 2'' are retained in the respective receiving pockets 8 not only at three, but on all four sides, in such a manner that they can move when heated. The overlap distance between the insulating foils 2'' and the receiving pockets 8, and the legs 4.1 of the U-profiled strips 4, respectively, is again designated with reference symbol a2, while the free space inside of the receiving pockets 8 with reference symbol a1 (See FIG. 9). The four outside surfaces of the housing plates are designated with reference numerals 9.1 and 9.4, 9.4, and the bottom-and top surfaces with 9.2 and 9.3. Obviously, this is a heat insulating cassette which is closed on all sides, and gas-tightly encapsulated by the housing plates 9. To obtain an essentially flat contact surface for the insulating foils 2'' at the legs 4.1 of the u-profiled strips even in the corner regions, one U-profiled strip is provided with an offset smaller end 4.3, as shown in FIG. 11, over which the regular U-profiled strip can form-fittingly grip, as clarified by the arrow 16. The regular strips in FIG. 9 are the upper and the lower strips, the strips with the offset ends are on the left and on the right. Overlap regions 17 therefore result at the four corners. A corresponding construction can also be used for the two preceding embodiments.

The building block according to FIGS. 8 to 11—though it is closed at all four sides—additionally has thin sheetmetal tongues 18, in particular 18.1 and 18.2 at its outer periphery, which serve the purpose of forming an effective lamellar seal with corresponding mating tongues of an adjacent building block. Therefore one building block engages with the tongues 18.2 of one of its sides 9.1 (see FIG. 12) in the push-in pockets 19 of the other side of an adjacent building block. The push-in pockets are formed by the doubly-bent sheetmetal tongues 18.1 (see FIG. 13). When pushing the two building blocks together, the bent tongues 18.1 move a bit inward elastically, so that the push-in pockets 19 become narrower, and a sealing, lamellar-like engagement of the inserted tongues 18.2 which is still elastic when heat is applied is effected. Because of this sealing interlocking, a very effective convection-tight arrangement is also achieved for the outer periphery of the building blocks. As especially shown in FIGS. 12 and 13, the lamellar tongues 18.2 and 18.1 are provided with rectangular (FIG. 12) or acutely angled (FIG. 13) fastening-legs, which are secured to the respective housing wall by spot-welding 20. Thus, it can be seen that if the building blocks 1'' are joined together for forming a heat insulation in the vertical, side, or peripheral direction, the adjacent building blocks alternatingly engage each other with the knife-like, lamellar tongues 18.2 and with the doubly-bent lamellar-tongues 18.1 which form the push-in pockets 19. In this way, an elastic spring seal is formed, and the doubly-bent lamellar tongues 18.1 form acute angles with the respective housing plate, and can be elastically deformed toward the inside with the push-in pockets 19 getting tighter because of the joining of the units. For this purpose, the distances between the knife-like tongues 18.2 with respect to each other, and for the doubly-bent tongues 18.1 are constructed according to a pre-planned pattern.

Figure 12:
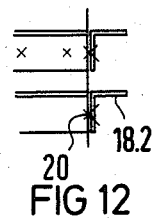
FIG. 12 is an enlarged view of the dot-dash circle X in FIG. 8.
Figure 13:
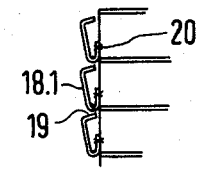
FIG. 13 is an enlarged view of the dot-dash circle Y in FIG. 8.

In case the building blocks according to FIGS. 8 to 11, and also FIGS. 12 and 13 are used for heat insulation of a reactor pressure vessel, or another component with a corresponding height, it is understood that the building blocks can be provided with suitable suspension ledges 11 (compare FIGS. 4 to 6).

The manufacture of the building blocks will be explained with the aid of FIG. 8. For this purpose, let us assume, that a sheetmetal box without a top surface 9.3 is already available. To begin with a first U-profiled strip-frame I is inserted, and with its circumferential element 4.0 (see FIG. 11) fastened by spot-welding to the housing plates 9.1, 9.4. Thereafter, a first insulating foil 2'' is placed onto the surface provided by the frame, and by means of the next U-profiled strip-frame II pressed onto the first frame I below. In this pressed-down state, the frame II is welded to the housing plates 9.1, 9.4, then the next insulating foil 2'' can be laid down and pressed down and held by the third frame III etc., until the complete stack of U-profiled strips and the stack of frames and insulating foils is installed in the sheetmetal box, whereafter the top plate 9.3 of the housing is placed in position and welded. If, in the preceding, U-profiled strips are mentioned, it is understood that in the case of the embodiments according to FIGS. 1 to 3, and also according to FIGS. 4 to 6, the uppermost and lowest profile strip can also have the form of an angular strip.

Figure 14:
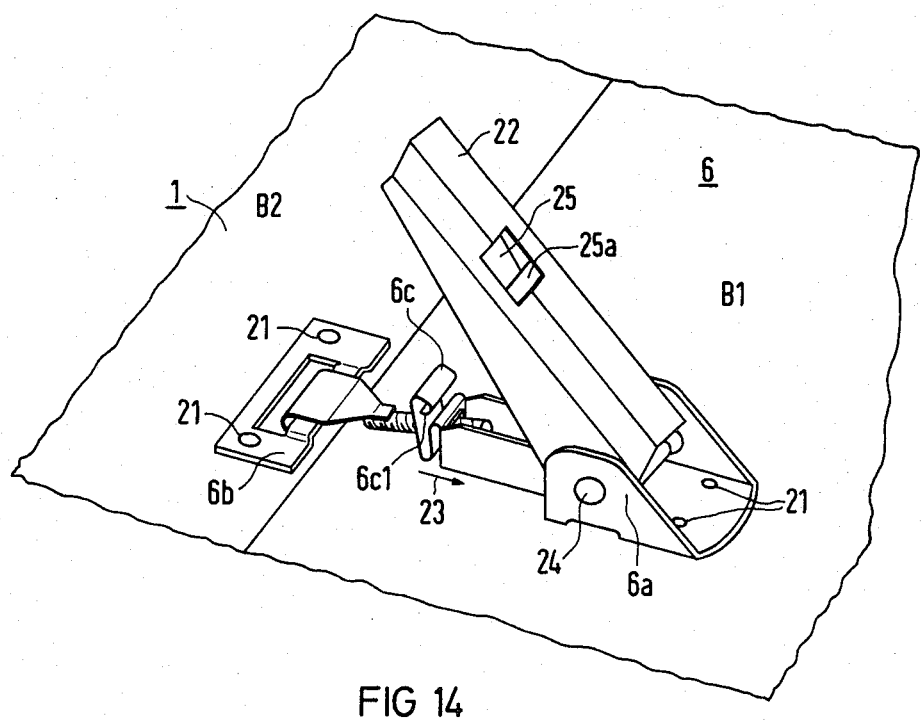
FIG. 14 is a fragmentary, diagrammatic view of a rapid tension closure for the embodiment according to FIG. 1.

Coming back to FIG. 14, it must still be added that the rapid locking toggle clamp 6, because of the required gas-tightness of the building blocks, is not to be secured to the housing plates by sheetmetal screws, but by spot-welds, i.e. the counter latch 6b and the tension bracket 6a. The toggle joint which is not further shown effects a movement of the spring clamp 6c in direction of the arrow 23 toward an axis 24 when the bell-crank lever 22 is closed, so that the housing plate B1 is therefore pulled toward the housing plate B2. At the end of the tightening operation, the spring-clamp 6c engages with its nose 6c1 behind the edge 25a of the engagement perforation 25 of the bell-crank lever 22.

In the sense of the invention, it should be understood that U-shaped spacing elements in general, which form the receiving pockets 8 for the insulating foils with their directly adjacent legs are included under the term U-profiled strips. Therefore, in the sense of the invention, U-profiled strips can be formed by a combination of elements with an L-shaped cross-section, or correspondingly shaped L-profile strips, or they can be constructed by meander-like bending of correspondingly thinner sheetmetal, forming multiple U-profiled strips.

FIG. 15 shows spacing elements 40, having a U-profile formed by the combination of two L-profiled strips 40a, 40b. The receiving pockets are again designated with reference numeral 8, and the insulating foils with reference numeral 2'''.

FIG. 16 shows, in cross section, a multiple-U-profiled strip 400, which is constructed as a meander-shaped bent profile band, having U-shaped legs 400a, 400b which form the receiving pockets 8 in the form of cross-sectional hairpin-shaped projections. For each receiving channel 8, there is therefore formed a triple bend loop with the two outer, rounded, loop reversing points S1, S2, and with the central rounded loop reversing point S3 at the bottom of the receiving channel 8. If the angle bends S4, S5 at the beginning and at the end of the respective triple loop are also added, there are formed a total of five bends for each reversing channel 8. This has the advantage that, inspite of using a relative thin sheetmetal gage, a very high form stability of the spacing element can be achieved, and also a more simplified manufacture and assembly is made possible.

There is claimed:

1. All-metal heat insulation, comprising building blocks which can be joined together, said building blocks each including metallic foils thermally movably supported and mutually spaced apart from each other forming insulating cells therebetween, said building blocks being substantially cube-shaped and said foils being substantially parallel to each other, spacer strips for maintaining said mutual spacing between said foils, and at least two housing plates at least partly surrounding said foils and spacer strips and being disposed at a given distance from each other, said spacer strips being adjacent to each other and being fastened to at least one of said housing plates, said spacer strips being mutually spaced apart from each other at a distance at least equal to the thickness of one foil forming receiving pockets for said foils at least at one of said plates, said foils being shorter than said given distance between said housing plates and being slideably fitted in said receiving pockets.

2. All-metal heat insulation, comprising building blocks which can be joined together, said building blocks each including metallic foils thermally movably supported and mutually spaced apart from each other forming insulating cells therebetween, spacer strips for maintaining said mutual spacing between said foils, and at least two housing plates at least partly surrounding said foils and spacer strips and being disposed at a given distance from each other, said spacer strips being adjacent to each other and being fastened to at least one of said housing plates, said spacer strips being mutually spaced apart from each other at a distance at least equal to the thickness of one foil forming receiving pockets for said foils at least at one of said plates, said foils being shorter than said given distance between said housing plates and being slideably fitted in said receiving pockets, said foils having four sides and said receiving pockets being disposed at each of said four sides for thermally movably retaining said foils thereat.

3. All-metal heat insulation, comprising building blocks which can be joined together, said building blocks each including metallic foils thermally movably supported and mutually spaced apart from each other forming insulating cells therebetween, spacer strips for maintaining said mutual spacing between said foils, and at least two housing plates at least partly surrounding said foils and spacer strips and being disposed at a given distance from each other, said spacer strips being adjacent to each other and being fastened to at least one of said housing plates, said spacer strips being mutually spaced apart from each other at a distance at least equal to the thickness of one foil forming receiving pockets for said foils at least at one of said plates, said foils being shorter than said given distance between said housing plates and being slideably fitted in said receiving pockets, said foils having one bent side welded to one of said housing plates and other sides thermally movably retained in said receiving pockets.

* * * * *